May 9, 1933.                K. E. PEILER                1,907,570
GLASS SHAPING MECHANISM
Original Filed Nov. 15, 1928
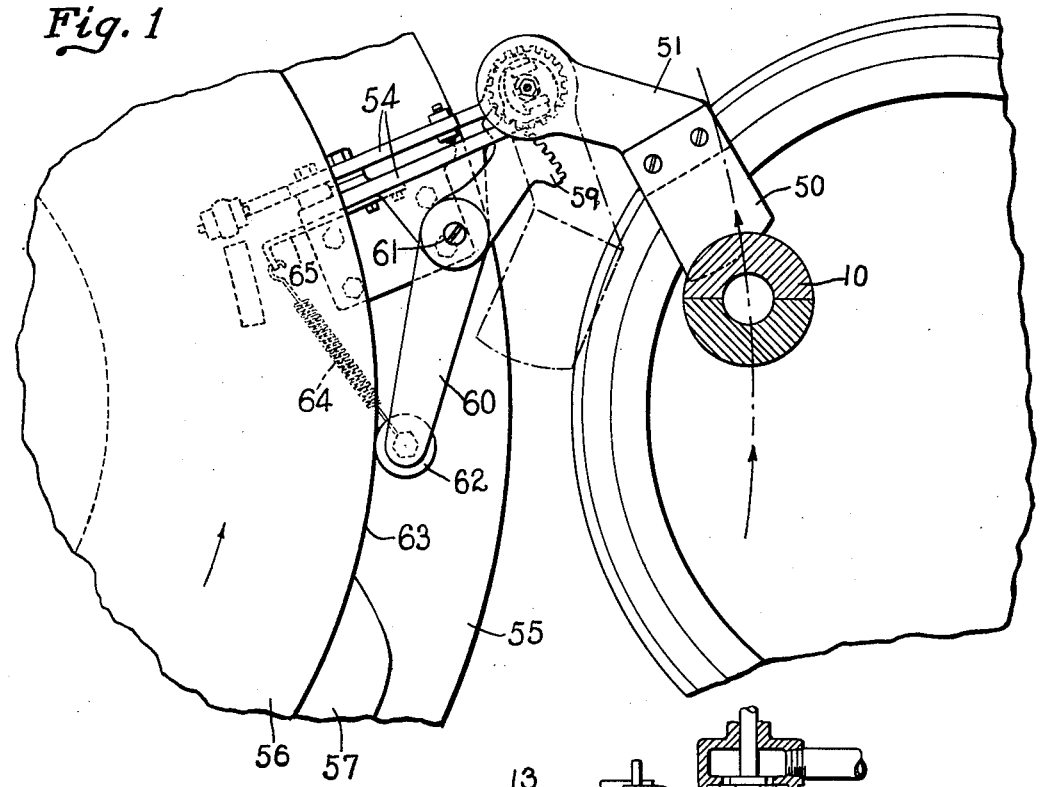
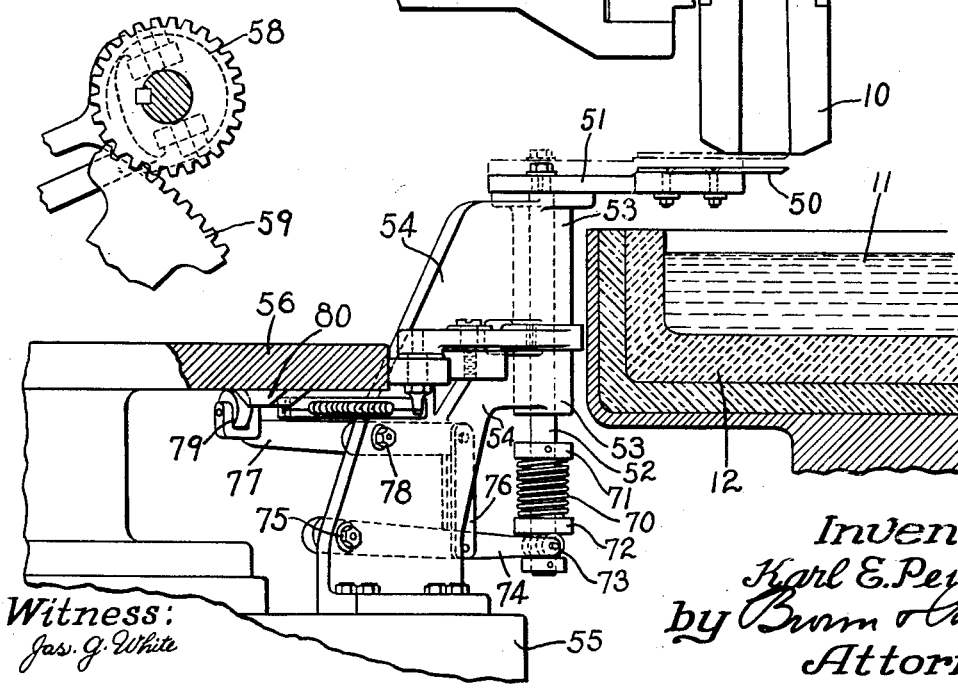
Inventor
Karl E. Peiler
by Brown & Carlam
Attorneys
Witness:
Jas. G. White Patented May 9, 1933

1,907,570

UNITED STATES PATENT OFFICE

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE

GLASS SHAPING MECHANISM

Original application filed November 15, 1928, Serial No. 319,462. Divided and this application filed February 19, 1930. Serial No. 429,572.

My invention relates to the art of separating mold charges of molten glass from a supply in a tank or pool by means of molds or feeding cups that are brought into contact with the surface of the glass and are charged with glass by suction produced in the molds or cups.

The general object of my invention is to provide improved means for severing the glass in the charged molds or cups from the glass in the supply body.

More specifically, the objects of my invention are to provide an improved severing device for use in apparatus of the above-indicated character, including a shear blade which may cooperate with a plurality of molds or cups brought successively to the charging position, and which, in such an arrangement, is arranged to properly cooperate with molds or cups having their bottoms at different heights, thereby enabling the production of articles of different heights on the same machine; and to provide such a shearing mechanism wherein the shear blade is pressed yieldingly against the bottoms of the molds or cups and is removed from the hot severing position above the gathering pool in the intervals between the severing operations. It is preferred that the shear blade in this arrangement be made to approach each mold or cup by a rising motion to bring the blade into contact with the bottom of the mold or cup, and that the blade be then maintained yieldingly against the bottom of the mold or cup during the severing operation.

The severing mechanism herein shown and described constitutes an improvement over the ordinary shearing mechanism, such as is employed, for example, in the well-known Owens bottle machine, wherein each gathering mold of the machine is provided with its individual knife which slides across and in contact with the lower surface of the mold, or in contact with a shear bushing carried by the mold, without any means for yieldingly pressing the knife into proper sliding contact with the mold.

The arrangements for causing the shear blade to cooperate with molds or gathering cups having their bottoms at different levels permits different lengths of suction molds to be used on the same bottle machine at the same time, while still permitting the upper ends of the body portions of the different suction mold cavities to be brought to a common level. It is extremely desirable in a bottle machine of this type, to have the parting line or joint between the bottom of the various neck mold cavities and the respective upper ends of the cooperating suction mold cavities, to be in substantially the same plane. This permits various mold operations, as well as the subsequent handling of the ware, to be made with less difficulty. Therefore, in order to make, at the same time, articles of different height, it may be highly desirable, in order to meet the above conditions, to have the parison mold bottoms or lower ends, at different heights. It is one of the objects of the present invention to permit this with the use of one shear blade cooperating with a plurality of such molds.

The embodiment of the invention as herein disclosed and claimed is one of two embodiments of the invention disclosed in my co-pending application, Serial No. 319,462, filed Nov. 15, 1928, and this application is a division of the aforesaid application.

In the following description my invention will be described mainly in connection with suction-fed molds. It will be understood that this description applies equally well to feeding cups that are charged by suction and thereafter empty their charges into molds, and that my invention includes both of these kinds of apparatus.

In the accompanying drawing,

Figure 1 is a plan of a portion of a system of glass working apparatus equipped with an embodiment of my invention;

Fig. 2 is a side view, partly in elevation and partly in vertical section, of the apparatus shown in Fig. 1; and Fig. 3 is a detail plan view of a part of the knife-shifting mechanism shown in Figs. 1 and 2.

The numeral 10 indicates a parison mold of the suction type adapted to be lowered into contact with a gathering pool of molten glass 11 contained in a refractory receptacle 12 which may be a rotary tank or pot, such as is used with the Owens machine, or may be any other suitable container for a supply of molten glass. The construction of the mold and the arrangements for opening and closing the mold, for presenting it to the gathering pool, and for producing suction in the mold to gather the glass, form no part of my present invention. The mold 10, as shown is carried by a head 13 which may form part of a rotary bottle-making machine of the Owens type or may be associated with any other suitable mechanism.

The glass severing mechanism with which my invention is concerned, consists of a shear blade 50 carried by a rocking arm 51, secured to the upper end of a rock shaft 52 which is mounted in vertical bearings 53 carried by fixed brackets 54 that are mounted on a suitable support 55 which may conveniently be a part of the stationary frame of the glass-working machine. In the particular arrangement shown, a portion of a rotary element 56 of the machine is also shown, and this rotary part 56 carries cam projections 57, one for each of the molds 10. These cams 57 act to swing the shear blade 50 from its working position, shown in full lines in Fig. 1, to its idle position, shown in dot-and-dash lines. This swinging movement of the shear blade is accomplished by means of a spur gear 58 carried by the rock shaft 52, about midway between its ends, and meshing with a gear segment 59 upon one end of a lever 60 which is pivoted at 61 to one of the brackets 54. The end of the lever 60 opposite to the segment 59 carries a roller 62 that rides upon the edge surface 63 of the rotary part 56 of the glass-working machine. A spring 64 is connected between the outer end of the lever 60 and a fixed member 65 and serves to hold the roller 62 in contact with the surface 63. It will be apparent that as the member 56 rotates in the direction indicated by the arrow in Fig. 1, the cam member 57 will engage the roller 62, rock the arm 60 and, through the segment 59 and the gear 58, swing the shear blade 50 from the full-line position to the dot-and-dash line position shown in Fig. 1. Thereafter, when the cam 57 passes beyond the roller 62, the spring 64 returns the parts to the working position shown in Fig. 1.

For the purpose of giving the shear blade 50 an upward spring pressure while it is in contact with the mold, a spring 70 surrounds the rock shaft 52 near its lower end between a collar 71 on the rock shaft and a floating collar 72 which rests upon rollers 73 carried by the arms of the forked end of a lever 74 that is pivoted at 75 to one of the brackets 54 and is connected by means of a link 76 to a lever 77 pivoted at 78 and carrying at its outer end a roller 79 that normally runs against the under surface of the rotary member 56. A cam 80 is secured beneath the table 56 in such relation to the roller 79 that, as the member 56 rotates, the roller 79 will be depressed by the cam 80 at the time when each successive mold arrives above the cutting end of the shear blade 50. This depression of the roller 79, acting through the lever 77, the link 76 and the lever 74, compresses the spring 70 and lifts the rock shaft 52, and consequently the shear blade 50, from the full-line position shown in Fig. 2 to the dotted-line position, where it engages the bottom of the mold 10 and is maintained yieldingly against the bottom of the mold while the mold travels across the shear blade. Thereafter, when the cam 80 moves beyond the roller 79, the rock shaft 52 and the blade 50 are lowered to their full-line positions.

The yielding upward movement imparted to the shear blade enables the blade to cooperate with molds of different heights within considerable limits.

The structure shown and described herein may be variously modified within the scope of the appended claims.

I claim as my invention:

1. Mechanism for severing glass segregated into mold charges by suction, comprising a shear blade, means for rocking said shear blade laterally between a position above a glass supply and a position removed from said glass supply, comprising a rock shaft carrying said shear blade, means for rocking said shaft periodically, automatic means for periodically raising and lowering said rock shaft and said shear blade, and a yielding connection between said rock shaft and said automatic means.

2. Glass fabricating apparatus comprising a suction mold, means for moving said mold into and out of contact with a supply body of glass to charge the mold by suction, glass severing mechanism stationarily mounted as a whole adjacent said supply body of glass, and comprising a shear blade, means for rocking said shear blade into and out of a position above said supply body and in the path of movement of said mold, means for periodically raising and lowering said shear blade into and out of a position for severing the glass depending from said mold, and a yielding connection between said last-named means and said second-named means affording vertical self-adjustment of said shear blade as a result of the engagement of the mold therewith.

3. Glass shaping apparatus including a suction mold, a supply body of molten glass, means for moving said mold into and out of contact with said glass to charge the mold by suction, glass severing mechanism mounted independently of said mold and stationary relative thereto, said mechanism including a shear blade, means for rocking said shear blade laterally into and out of a position above said body of glass, means operating in timed relation to the movement of said mold for raising said shear blade into a position for engagement with said mold, and means for yieldingly holding said shear blade stationary for severing engagement with said mold.

4. In combination, a glassware forming machine including a suction mold, a glass severing device stationarily mounted with respect to said mold, and means for operating said device comprising a vertical rock shaft upon which the device is mounted, a yielding support for said rock shaft, and means driven by said machine for periodically oscillating and reciprocating said rock shaft.

5. In combination with a container for a pool of molten glass, a receptacle adapted to gather charges of glass from the surface of said pool, and glass severing mechanism for successively separating charges from the glass in the pool, comprising a stationary frame, a vertical rotary shaft journaled in said frame and slidable therein, a shear blade carried by said shaft, automatic means for oscillating said shaft to swing the shear blade laterally from a working position over said pool to an idle cooling position laterally of said pool, automatic means for reciprocating said shaft and shear blade in timed relation to the oscillation thereof, and a yielding connection between the last-named means and said shaft arranged to afford self-adjustment of said shear blade as a result of the engagement of said blade with said mold.

Signed at Hartford, Connecticut, this 17th day of February, 1930.

KARL E. PEILER.